United States Patent
Shah et al.

(10) Patent No.: US 10,743,174 B2
(45) Date of Patent: Aug. 11, 2020

(54) HANDLING UNIVERSAL PROFILE TRANSFERS OVER ROAMING

(71) Applicant: T-Mobile USA, Inc., Bellevue, WA (US)

(72) Inventors: Neha Shah, Issaquah, WA (US); Adrian Synal, Kirkland, WA (US); Maziar Fallah, Preston, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/599,045

(22) Filed: Oct. 10, 2019

(65) Prior Publication Data
US 2020/0120486 A1   Apr. 16, 2020

Related U.S. Application Data

(60) Provisional application No. 62/744,568, filed on Oct. 11, 2018.

(51) Int. Cl.
*H04W 8/24* (2009.01)
*H04L 29/08* (2006.01)

(52) U.S. Cl.
CPC .............. *H04W 8/24* (2013.01); *H04L 67/141* (2013.01)

(58) Field of Classification Search
CPC ........... H04W 8/18; H04W 8/22; H04W 8/24; H04W 8/245; H04L 67/141
See application file for complete search history.

(56) References Cited

U.S. PATENT DOCUMENTS 9,654,964 B1 * 5/2017 Carames ................. H04W 4/90
2010/0050234 A1 * 2/2010 Lindholm ........... H04L 65/1043
                                                               726/3
(Continued)

FOREIGN PATENT DOCUMENTS

WO    2014177174 A1   11/2014

OTHER PUBLICATIONS

Ericsson, 'Applicability of SIP header fields on a roaming II-NNI'. C3-153044, 3GPP TSG-CT WG3 Meeting #82, Vancouver, Canada, Aug. 5, 2015See section 6. 1. 1. 3 . 3.

(Continued)

*Primary Examiner* — Dinh Nguyen
(74) *Attorney, Agent, or Firm* — Han Santos, PLLC

(57) ABSTRACT

Techniques are described herein for implementing a presence application server to handle Universal Profile (UP) transfers over roaming. The presence application server may receive a Session Initiation Protocol (SIP) request from a user device. The SIP request can include presence information of the user device, P-Access-Network-Info (PANI), and a subscriber identifier of a subscriber associated with the user device. Based at least on the presence information, the presence application server can determine whether the user device is UP capable. Additionally, the presence application server can determine whether the user device is roaming based at least on the PANI. If the user device is roaming, the presence application server can indicate that the user device is roaming and remove a tuple associated with the presence information indicating the UP capabilities of the user device in a SIP response. Removing the tuple suspends the user device's UP capabilities.

20 Claims, 5 Drawing Sheets

(56) References Cited

U.S. PATENT DOCUMENTS

| | | | |
|---|---|---|---|
| 2010/0145912 A1* | 6/2010 | Li | H04L 43/00 |
| | | | 707/622 |
| 2010/0290392 A1 | 11/2010 | Rasanen et al. | |
| 2011/0090903 A1* | 4/2011 | Jonsson | H04L 65/1073 |
| | | | 370/352 |
| 2013/0208629 A1* | 8/2013 | Luo | H04M 15/22 |
| | | | 370/259 |
| 2017/0195849 A1* | 7/2017 | Osterlund | H04W 4/023 |
| 2017/0339552 A1 | 11/2017 | Xu | |
| 2017/0347258 A1 | 11/2017 | Carbone et al. | |
| 2018/0041350 A1* | 2/2018 | Karlsson | H04L 65/1016 |
| 2019/0075139 A1* | 3/2019 | Bouvet | H04L 65/1073 |

OTHER PUBLICATIONS

International Patent Application No. PCT/US2019/055996, International Search Report and Written Opinion, dated Feb. 5, 2020, 10 pages.

* cited by examiner

HANDLING UNIVERSAL PROFILE TRANSFERS OVER ROAMING

RELATED APPLICATION

This application claims priority to a commonly owned U.S. Provisional Patent Application No. 62/744,568 filed on Oct. 11, 2018, and titled "Handling Universal Profile Transfers Over Roaming," which is herein incorporated by reference in its entirety.

BACKGROUND

Universal Profile (UP) is the evolution of Rich Communication Services (RCS). Introduced in GSM Association (GSMA) specifications via RCC 0.71 v1.0. Universal Profile introduces enhanced features, including open group chats (up to 100 users), large File Transfers (up to 100 MB), capability discovery, audio messaging, video sharing, multi-device, enriched calling, location share, live sketching, improved authentication, and/or so forth. It also introduces the key enablers for Messaging as a Platform (MaaP). This includes support for RCS business messaging, Rich Cards, privacy control, and spam protection.

Previously, legacy pre-UP file transfers only required IMS/Session Initiation Protocol (SIP) connectivity. RCS utilizes Internet Protocol (IP) Multimedia Services (IMS). The mechanism of File Transfer in UP (FTHTTP) requires a user to upload the file via a data connection to a content server before using SIP to deliver the message. Transferring large files is not always feasible when user devices are roaming due to complexities in charging over roaming and data connectivity. Current GSMA specifications, however, offer limited methodologies of maintaining messaging user experience while balancing roaming network conditions.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
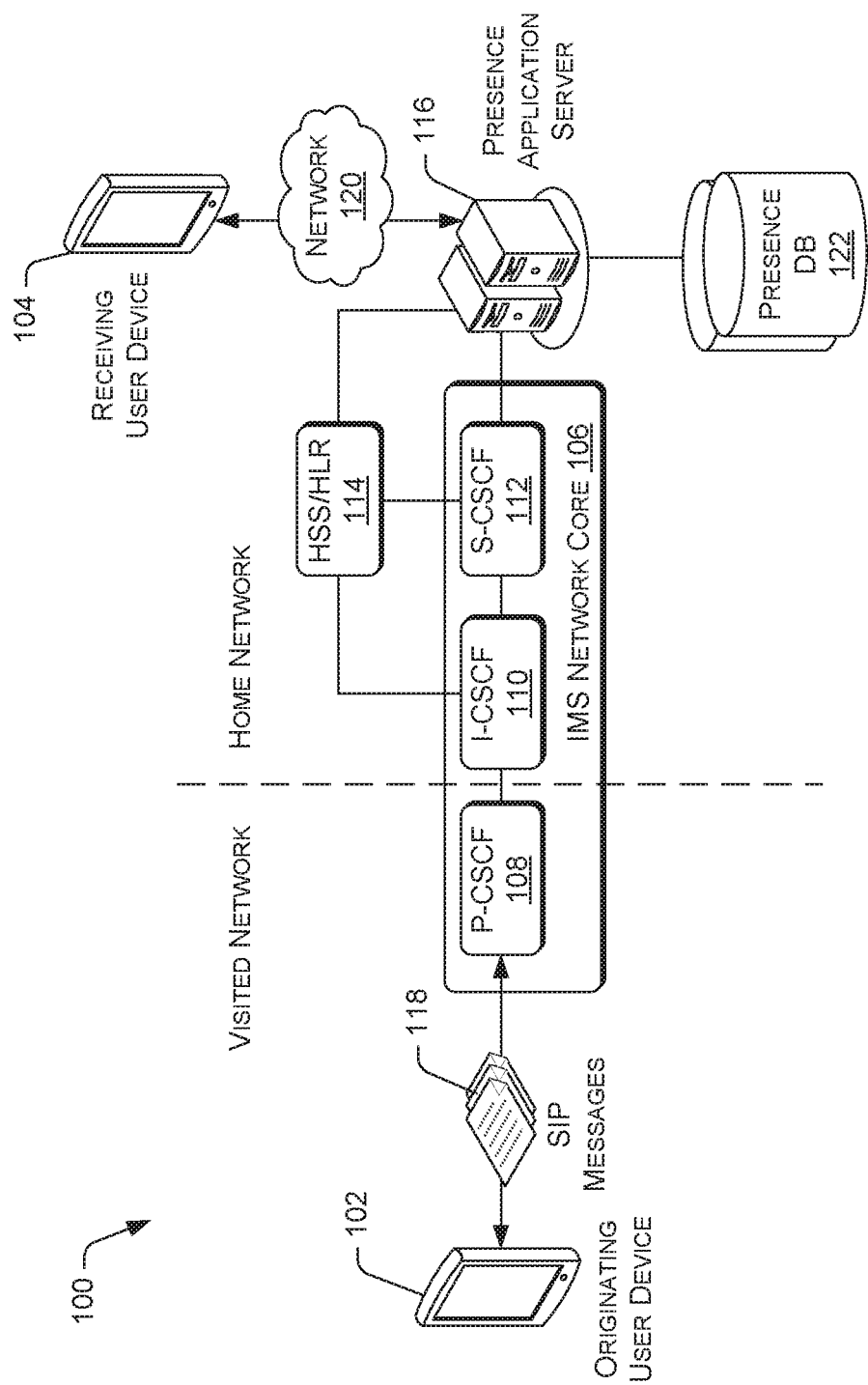
FIG. 1 illustrates an example of network architecture for handling UP transfers over roaming.

This disclosure is directed to techniques for handling UP transfers over roaming to provide flexibility on the network to support the removal of UP capabilities as needed. In some aspects, the techniques may implement a presence application server to determine a user device's UP capabilities based at least on the user device's presence information. The presence information can include various types of information, such as the service capabilities of the user device. The service capabilities of the user device include an ability to convey to other user devices the types of IMS based services of which the user device is capable. The IMS based services can include multimedia telephony (MMTel) services, such as voice, real-time video, chat, text, file transfer, and/or other services. The presence information can be included in incoming requests from the user device to the presence application server (e.g., to subscribe to IMS based services). The presence information can be associated with a data type. For example, the data type can comprise a tuple in various programming languages. Accordingly, the presence application server may identify a predetermined tuple that indicates whether the user device is UP capable. In one example, the predetermined tuple can include a File Transfer over HTTP (FTHTTP) tuple (org.openmobilealliance:File-Transfer-HTTP).

In response to determining that the user device is UP capable, the presence application may configure the user device's UP capabilities based at least on the P-Access-Network-Info (PANI) included in the incoming requests from the user device. The PANI can be used to determine whether the user device is roaming or in a visited network. If the user device is in a visited network, the presence application server may remove the predetermined tuple in a response to the user device. By removing the predetermined tuple in the response, the user device will not have UP capabilities while roaming. Additionally, the presence application server may implement a flagging mechanism to indicate in a centralized presence database that the user device is roaming. The presence database may also include the presence information associated with the user device.

In some implementations, the presence application server may receive additional requests from additional user devices for presence information of the user device. For example, the additional user devices may request presence information of the user device to determine whether the user device is available to perform communications with the additional user devices. The presence application server can retrieve the presence information of the user device from the presence database and share the presence information of the user device with the additional user devices.

In the event the user device returns to a home network, the user device can publish updated PANI. In response, the presence application server can determine that the user device is in the home network based at least on the updated PANI and restore the UP capabilities tuple for any subsequent responses, thereby updating presence information of the user device. Additionally, the presence application server may reset the flag in the centralized presence database to indicate that the user device is not roaming.

Example Network Architecture

FIG. 1 illustrates an example of network architecture 100 for utilizing a system configuration of a presence application server to handle UP transfers over roaming. The architecture 100 includes at least one user device that can have RCS functionality or UP capability. The user devices can include an originating user device 102 and a receiving user device 104. In various implementations, the originating user device 102 may function as the receiving user device and vice versa. The user devices 102 and 104 described herein may be implemented as any suitable communication devices configured to communicate over a wireless network, including, without limitation, a mobile phone (e.g., a smartphone), a tablet computer, a laptop computer, a desktop or personal computer, a set-top-box (STB), a game console, a smart television, a personal digital assistant (PDA), a wearable device (e.g., electronic/smart glasses, a smartwatch, fitness trackers, etc.), a networked digital camera, and/or other devices capable of receiving input and providing output. The user devices 102 and 104 include a Universal Integrated Circuit Card (UICC) or a Subscriber Identity Module (SIM) card.

The user devices 102 and 104 may be connected to an access network (e.g., the RAN) over a physical communications interface or layer such as air interface and/or direct wired connection. The air interface can comply with a given network communications/data technology, protocol, or standard, such as Global system for Mobile communications (GSM), Time Division Multiple Access (TDMA), Universal Mobile Telecommunications System (UMTS), Evolution-Data Optimized (EVDO), 2G, 3G, 4G, 5G, Long Term Evolution (LTE), Advanced LTE, Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, Wi-Fi, a local area network (LAN), a wide area network (WAN), a collection of networks (e.g., the Internet), and/or any future IP-based network technology or evolution of an existing IP-based network technology.

The RAN includes a plurality of access points that serve the user device 102 over the air interface. The access points in the RAN can be referred to as access nodes (ANs), access points (APs), base stations, Node Bs, eNode Bs, and/or so forth. The RAN is configured to connect to a core network that can perform a variety of functions, including bridging circuit switched (CS) calls between user devices 102 and 104 served by the RAN and other user devices served by the RAN or a different RAN altogether, and can also mediate an exchange of packet-switched (PS) data with external network(s) 102 such as the Internet.

The network architecture 100 may also include an IMS network core 106 that implements SIP-based communication. The IMS network core 106 includes a gateway and the Call Session Control Function (CSCF) node. The CSCF node may handle SIP sessions, which are communication sessions for packet-based voice and video calls, instant messaging over IP networks, and/or so forth. The CSCF nodes may identify a user device 102 based on a registry of the user device 102 of a subscriber, e.g., the Implicit Registration Set (IRS), stored in the HSS/HLR 114 (e.g., a user information server, a profile database, etc.) of the network. The IRS can include an IP Multimedia Public Identity (IMPU) of the subscriber in the form of the MSISDN as well as IP Multimedia Private Identity (IMPI) in the form of device identifiers, such as International Mobile Equipment Identity (IMEI), of the user device 102. The user device 102 that is registered by the CSCF node of the IMS network core 106 may be able to use a telephone number to initiate and receive communication. If the user device 102 is listed in the IRS, but not registered by the CSCF node of the IMS network core 106, the user device 102 will not be able to initiate and receive communication that is routed via the telephone number.

Figure 2:
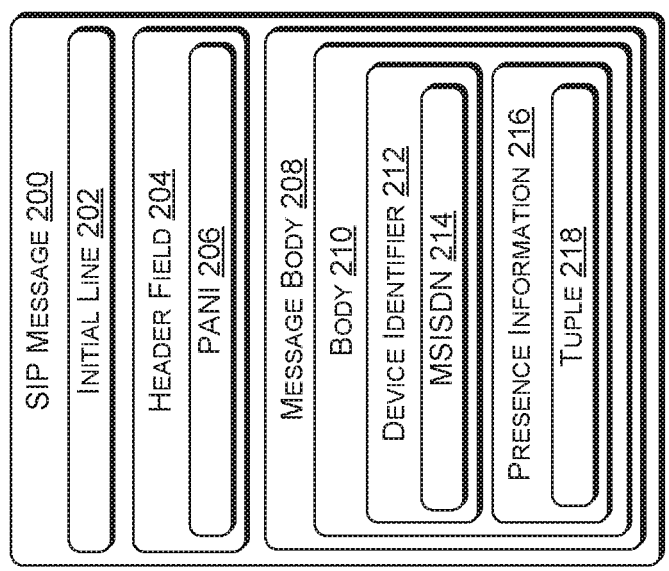
FIG. 2 is a block diagram showing various components of an exemplary SIP message.

In the illustrated embodiment, the IMS network core 106 includes the Proxy-Call Session Control Function (P-CSCF) 108, the Interrogating-Call Session Control Function (I-CSCF) 110, and the Serving-Call Session Control Function (S-CSCF) 112. The user device 102 may communicate with a P-CSCF 108 over a gateway using a Gm interface and SIP. The P-CSCF 108 may route incoming SIP messages 118 to an IMS registrar server or other RCS entities. A SIP message can be a SIP response or a SIP request. SIP messages 118 comprise a standardized message structure as depicted in FIG. 2.

The P-CSCF 108 may also safeguard the security of the IMS network core 106 by handling Internet Protocol Security (IPSec) for communications that are exchanged by the user device 102. In some aspects, the P-CSCF 108 may handle Remote Authentication Dial-In User Service (RA-DIUS) sessions instead of SIP sessions. The S-CSCF 112 handles sessions in the network and routes SIP messages to appropriate IMS application servers (e.g., a presence application server 116) and the P-CSCF 108. The S-CSCF 112 communicates with the P-CSCF 108 using an Mw interface, which is used to exchange messages between CSCFs. The I-CSCF 110 is used as an entry point to find a subscriber in the network and assist in assigning an S-CSCF 112 when a subscriber registers in the network.

The S-CSCF 112 is a central node of the signaling layer and is arranged to handle SIP registrations of the user devices 102 and 104 for IMS communications. The S-CSCF 112 has knowledge of user identification such as IMS Private User-ID uniquely identifying the user devices 102 and 104. The I-CSCF 110 may be an inbound SIP proxy server of the IMS network core 106. During IMS registration of a user device, the I-CSCF 110 may query the HSS/HLR 114 to obtain an address of the S-CSCF 112 and designate an S-CSCF 112 to service the user device. The I-CSCF 110 may be further responsible for routing incoming IMS session requests and terminating IMS sessions requests. The I-CSCF 110 may communicate with the IMS application servers such as the presence application server 116 over the Ma interface using SIP. The I-CSCF 110 and the S-CSCF 112 can also communicate with the HSS/HLR 114 utilizing a Cx interface and the Diameter protocol.

The HSS/HLR 114 is a database that contains the subscriber profile, including identities and what services have been subscribed to, and provides location functionality as well as an authentication/authorization database. The HSS/HLR 114 can include a user account information, wherein the user account is associated with the user device 102. The user account can correspond to an account identifier or a subscriber identifier that is associated with one or more subscribers of a telecommunications service provider. For example, the account identifier or the subscriber identifier may be a Mobile Station International Subscriber Directory Number (MSISDN), an International Mobile Subscriber Identity (IMSI), a subscriber account number, and/or so forth.

An IMS registration is needed for the user device 102 to utilize IMS based services, which include RCS. The user device 102 in a visited network communicates with the P-CSCF 108 of the visited network. During the registration process, the user device 102 sends a registration message to the P-CSCF 108. The registration message is then forwarded to the I-CSCF 110 of the home network. Upon receiving the message, the I-CSCF 110 sends a CX-query/CX-select-pull message to the HSS/HLR 114 and receives, in response, a CX-query response/CX-select-pull response message. Based on the CX-query response/CX-select-pull response message, the I-CSCF 110 may send the registration message to the S-CSCF 112 of the home network. Upon receiving the registration message, the S-CSCF 112 sends a CX-put/CX-pull message to the HSS/HLR 114 and receives, in response, a CX-put response/CX-pull response message. The S-CSCF 112 may then perform service control such as contacting application servers (e.g., the presence application server 116), and send a 200 OK message back to the I-CSCF 110. The I-CSCF 110 then forwards the 200 OK message to the P-CSCF 108 and the P-CSCF 108 forwards the 200 OK message to the user device 102, which indicates that the user device 102 has successfully registered for IMS services. The techniques and systems described herein are not limited to the IMS network core 106, and any suitable computer network may benefit from the techniques and systems described herein.

The user device 102 and the presence application server 116 can communicate using SIP. The SIP is a signaling protocol that can be used to establish, modify, and terminate multimedia sessions over packet networks, and to authenticate access to IMS based services. The SIP is standardized by the Internet Engineering Task Force (IETF). A message in the form of a SIP request is a message 118 that is sent from the user device 102 to the IMS network core 106 (e.g., the presence application server 116) using SIP, such as a SIP PUBLISH method. The IMS network core 106 may route the SIP PUBLISH message to the presence application server 116.

The SIP request can include presence information associated with the user device 102. The presence information can include various types of information including service capabilities of the user device which conveys to other user devices the types of IMS based services of which the user device is capable. For example, the IMS based services can include MMTel services including voice, real-time video, chat, text, file transfer, and/or so forth. The presence information can be updated in real-time based on SIP requests received at the presence application server 116 from the user device 102. In addition, service availability information (e.g., whether the user device 102 is available to perform group texting), user availability information, communication status, device information, contact information, and/or other information may be included in the SIP request.

Additionally, the SIP request can include PANI and the MSISDN associated with the subscriber of the user device 102. The presence application server 116 may process the SIP request from the user device 102 to determine whether the user device 102 is UP capable based at least on the presence information. In some aspects, the presence application server 116 may determine whether the user device 102 comprises UP capabilities based at least on tuples associated with presence information included in the SIP request. For example, UP capabilities may be identified via the FTHTTP tuple (org.openmobilealliance:File-Transfer-HTTP).

If the user device 102 is UP capable, the presence application server 116 may determine whether the user device 102 is in a home network based at least on the PANI in the request. In response to determining that the user device 102 is roaming, the presence application server 116 may mark the MSISDN associated with the subscriber of the user device 102 as roaming via a roaming flag in a centralized presence database 122. The centralized presence database 122 can comprise any suitable data store or repository.

In response to the SIP request, the presence application server 116 may generate a SIP response. A SIP response is a message that is sent from the IMS network core 106 (e.g., the presence application server 116) back to the user device 102 using SIP, such as a SIP NOTIFY method. The presence application server 116 may remove the FTHTTP tuple from all instances of the SIP NOTIFY message. In this way, subsequent capability discovery to and from the user device 102 would not include the FTHTTP tuple, thus ensuring that the user device 102 is not UP capable. For instance, the user device 102 may only utilize legacy Multimedia Messaging Service (MMS) or FTMSRP for file transfers, thereby preventing users from experiencing IMS based services.

Subsequently, the presence application server 116 may receive an additional SIP request from the user device 102. The presence application server 116 may process the SIP request to determine whether the user device 102 is still roaming based at least on the PANI in the SIP request. In response to determining that the user device 102 is not roaming, the presence application server 116 may reset the roaming flag for the MSISDN associated with the subscriber of the user device 102 in the centralized presence database 122. Additionally, in response to the SIP request, the presence application server 116 may generate a SIP response restoring the FTHTTP tuple. In this way, subsequent capability discovery to and from the user device 102 would include the FTHTTP tuple, thus restoring the user device's 102 UP capabilities. For example, the user device 102 may utilize open group chats and large file transfers.

The presence application server 116 may also store the user device's 102 presence information in the presence database 122. In the event that the presence application server 116 may receive an additional request from the receiving user device 104 for presence information of the originating user device 102, the presence application server 116 can retrieve the presence information of the originating user device 102 from the presence database 122 and share the presence information of the originating user device 102 with the receiving user device 104. In this way, the receiving user device 104 may request presence information of the originating user device 102 to determine whether the originating user device 102 is available to perform communications with the receiving user device 104.

Example SIP Message Structure

FIG. 2 is a block diagram showing various components of an exemplary SIP message. In an exemplary implementation, the message structure of a SIP message 200 can comprise one initial line 202, one or more header fields 204, and a message body 208, wherein the message body can comprise one or more body parts 210. The header field 204 can hold various content such as P-Access-Network-Info 206, which can indicate whether a user device that is transmitting the SIP message 200 is roaming or in a visited network. The message body 208 can hold any content such as plain text, coded images, or any information that may be rendered (e.g., a Markup Language). Each message body or body part 210 is described using header fields such as Content-Disposition, Content-Encoding, Content-Type, and/or so forth, which provide information on its contents. In the illustrated embodiment, the body 210 includes device identifiers 212 or other identifying information associated with the user device such as MSISDN 214. Additionally, the body 210 can include the user device's presence information 216. The presence information 216 can indicate whether the user device is UP capable. The presence information 216 can be associated with a predetermined UP capabilities tuple 218 such as the FTHTTP tuple. Removing the tuple 218 from a responding SIP message can suspend UP capabilities for the user device, which can be indicated by the presence information 216.

Example Computing Device Components

Figure 3:
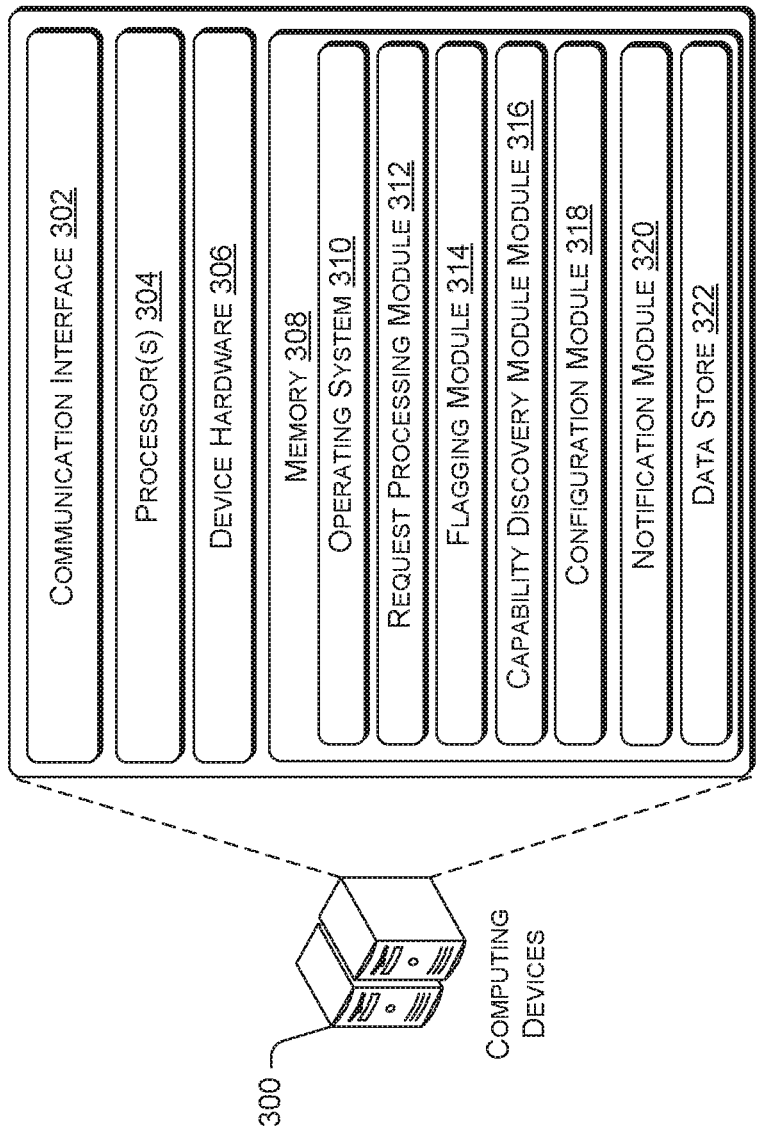
FIG. 3 is a block diagram showing various components of an illustrative computing device that implements handling UP transfers for user devices.

FIG. 3 is a block diagram showing various components of an illustrative computing device 300 for allowing tuple support to be configurable when a user device is roaming. It is noted that the computing device 300 as described herein can operate with more or fewer of the components shown herein. Additionally, the computing device 300 as shown herein or portions thereof can serve as a representation of one or more of the computing devices of the present system such as the presence application server.

The computing device 300 may include a communication interface 302, one or more processors 304, hardware 306, and memory 308. The communication interface 302 may include wireless and/or wired communication components that enable the computing device 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing device 300.

The memory 308 may store several software components including an operating system 310, a request processing module 312, a flagging module 314, a capability discovery module 316, a configuration module 318, a notification module 320, and a data store 322. The data store 322 can comprise a data management layer that includes software utilities for facilitating the acquisition, processing, storing, reporting, and analysis of data from multiple data sources. In various embodiments, the data store 322 can interface with an API for providing data access. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The operating system 310 may include components that enable the computing device 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The request processing module 312 may be configured to process SIP requests (e.g., SIP PUBLISH, SIP SUBSCRIBE) that are received from a user device of a subscriber in a network, such as the user device 102 of FIG. 1. For instance, the request processing module 312 may receive a SIP request from the user device in the form of the SIP PUBLISH or SIP SUBSCRIBE method. In another example, the request processing module 312 may receive a SIP request from an additional user device such as the user device 104 of FIG. 1 to subscribe to presence information of the user device (e.g., to determine whether to interact with the user device). For example, the request processing module 312 may receive a SIP request from the additional user device in the form of the SIP SUBSCRIBE method. The request processing module 312 may request additional information in response to receiving a SIP message from the user device. In some aspects, the request processing module 312 may request information from the user device using a pulling mechanism.

The flagging module 314 may be configured to flag MSISDN associated with the subscriber of the user device based at least on one or more predetermined values. For example, the flagging module 314 may refer to the PANI in the header of the received SIP request to determine whether the PANI includes one or more predetermined values (e.g., utran-cell-id-3gpp value). The PANI can include the radio access technology (RAT) or cell identity that can indicate whether the user device is in the home network. If the PANI in the SIP request does not include the predetermined values, the PANI indicates that the user device is not in a home network, the flagging module 314 may indicate that the user device is roaming. In some implementations, the flagging module 314 can use a flagging mechanism to flag or mark the MSISDN associated with the subscriber of the user device. The flagging module 314 can store the status of the user device as roaming in the data store 322. In the event that the user device returns to the home network, the flagging module 314 may refer to the PANI in the header of an additional SIP request to determine that the user device is in the home network and no longer roaming. For instance, the flagging module 314 can use the predetermined values to confirm that the PANI in the header of the additional SIP request indicates that the user device is in the home network. If the PANI in the additional SIP request indicates that the user device is in the home network, the flagging module 314 may reset the flag to indicate that the user device is not roaming. Additionally, the flagging module 314 can implement an update component to update the data store 322 to provide the most recent status of the user device.

The capability discovery module 316 may be configured to determine whether the user device is UP capable. In some implementations, the capability discovery module 316 may determine whether a predetermined UP capabilities tuple (e.g., FTHTTP tuple) is present in the body of the received SIP request. The predetermined tuple can be associated with presence information of the user device that indicates UP capabilities. If the predetermined tuple is present in the SIP request, the capability discovery module 316 can make a determination that the user device is UP capable. If the SIP request does not include the predetermined tuple, the capability discovery module 316 may determine that the user device is not UP capable.

The notification module 320 may be configured to generate a SIP response to the user device in response to the SIP request. The configuration module 318 may be configured to configure one or more tuples in the SIP response based at least on the one or more predetermined parameters. Particularly, the configuration module 318 may remove the predetermined tuple from a SIP response to the user device to temporarily disable the user device from utilizing UP services. In some implementations, the configuration module 318 may remove the predetermined tuple if the capability discovery module 316 indicates that the user device is UP capable and the flagging module 314 flags the MSISDN associated with the subscriber of the user device. In this way, for any subsequent SIP SUBSCRIBE messages transmitted to or received from the user device, the responding SIP NOTIFY message may not include the predetermined tuple.

Additionally, the configuration module 318 may restore the predetermined tuple if the capability discovery module 316 determines that conditions have changed. For example, the configuration module 318 may restore the predetermined tuple if the user device returns to the home network. In some aspects, the configuration module 318 may configure the predetermined tuple to optimize network performance. Upon configuring the predetermined tuple in the SIP response, the notification module 320 may serve the SIP response to the user device via the IMS network core.

Example Processes

Figure 4:
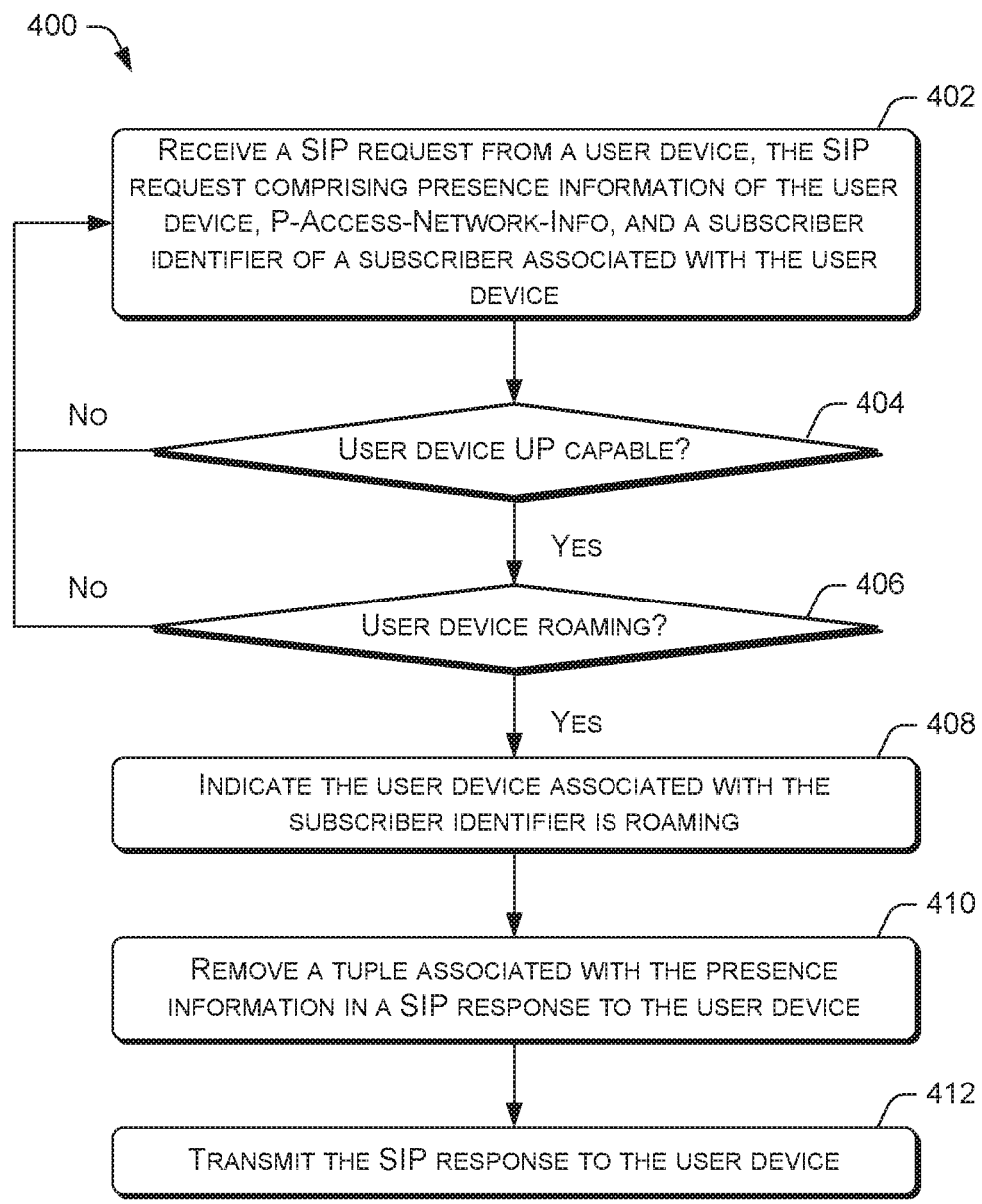
FIG. 4 is a flow diagram of an example process for configuring UP capabilities of a user device when the user device is roaming.
Figure 5:
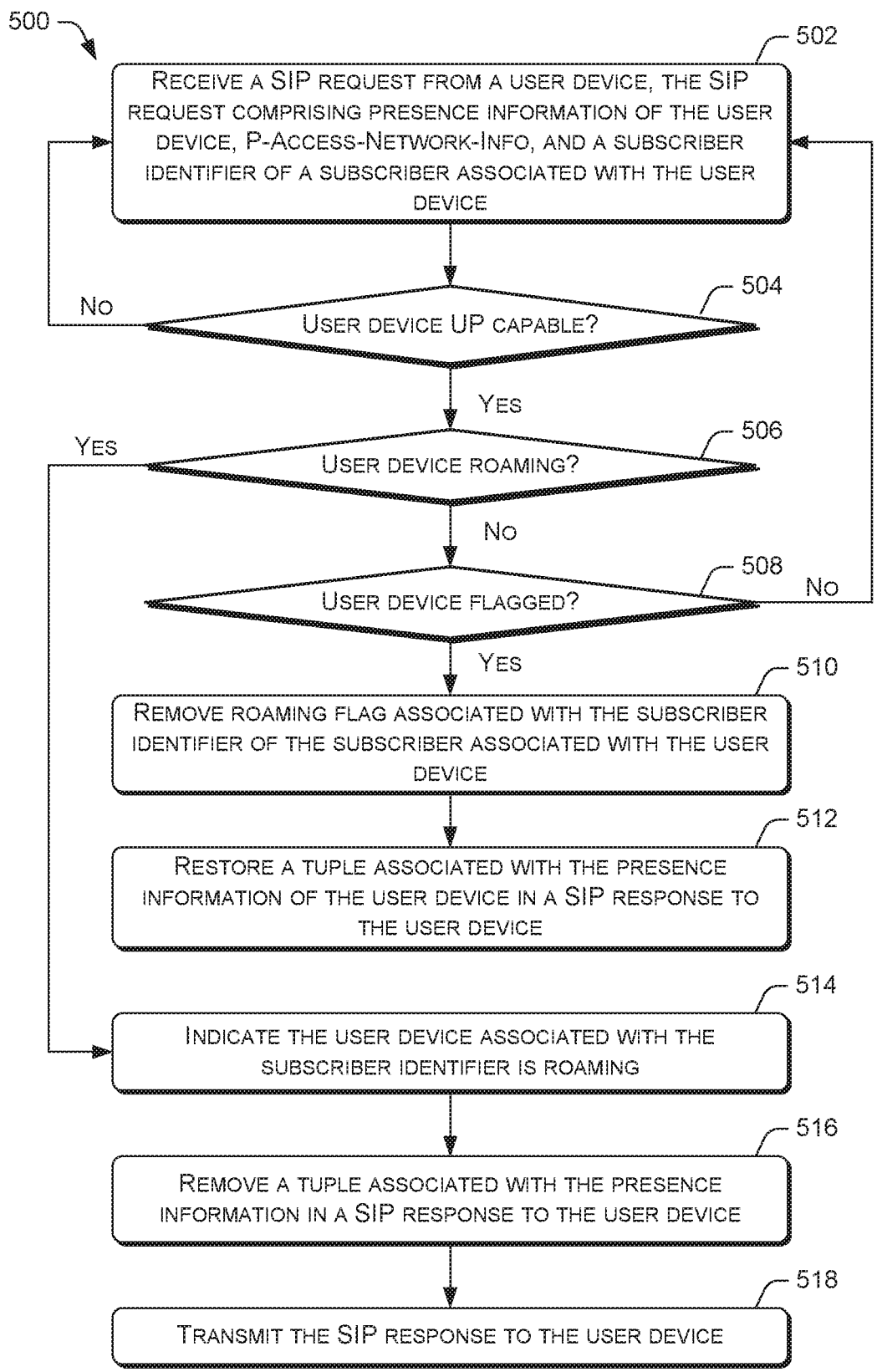
FIG. 5 is a flow diagram of an example process for configuring UP capabilities of a user device when the user device returns to a home network.

FIGS. 4 and 5 present illustrative processes 400-500 for configuring UP capabilities of a user device. The processes 400-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 are described with reference to FIGS. 1-3.

FIG. 4 is a flow diagram of an example process 400 for configuring UP capabilities of a user device when the user device is roaming. At block 402, the presence application server receives a SIP request from a user device. The SIP request can comprise the user device's presence information, P-Access-Network-Info, and a subscriber identifier associated with a subscriber of the user device. The user device may transmit the SIP request using a SIP PUBLISH method to the IMS network core and the IMS network core may route the SIP PUBLISH message to the presence application server. The SIP request may be processed via a request processing module of the presence application server.

At decision block 404, the presence application server determines whether the user device is UP capable based at least on the presence information in the SIP request. The presence application server may implement a capability discovery module to determine whether the user device is UP capable based on the presence of a predetermined UP capabilities tuple such as the FTHTTP tuple that is associated with the presence information. If the presence application server determines that the user device is not UP capable ("no" from the decision block 404), the process returns to block 402. If the presence application server determines that the user device is UP capable ("yes" from the decision block 404), the presence application server determines whether the user device is roaming, as indicated in decision block 406. The presence application server may implement a flagging module to determine whether the user device is roaming based at least on the PANI in the SIP request. For instance, the flagging module may utilize predetermined values to make a determination that the PANI indicates that the user device is in a visited network. If the user device is in a home network ("no" from the decision block 406), the process returns to block 402. In response to making a determination that the user device is in the visited network or roaming ("yes" from the decision block 406), the flagging module of the presence application server may indicate that the user device associated with the subscriber identifier is roaming, as indicated in block 408. In one example, the flagging module of the presence application server may mark the MSISDN associated with the subscriber of the user device as roaming in a centralized database of presence information associated with a plurality of user devices.

At block 410, the presence application server removes the tuple (e.g., FTHTTP tuple) in a SIP response (e.g., SIP NOTIFY) to the user device. The presence application server may implement a notification module to generate the SIP response. Additionally, the presence application server may implement a configuration module to remove the tuple from the SIP response. Stripping the tuple in the SIP response removes the UP capability from the user device while the user device is roaming. At block 412, the notification module of the presence application server serves the SIP response to the user device.

FIG. 5 is a flow diagram of an example process 500 for configuring UP capabilities of a user device when the user device returns to a home network. At block 502, the request processing module of the presence application server receives a SIP request from a user device. In some aspects, the presence application server may receive a SIP PUBLISH message that includes PANI in the header of the SIP PUBLISH message. The SIP request can also include the user device's presence information and a subscriber identifier associated with a subscriber of the user device. At decision block 504, the capability discovery module of the presence application server determines whether the user device is UP capable based at least on the presence information in the SIP request. If the capability discovery module identifies a predetermined UP capabilities tuple in the SIP request and makes a determination that the user device is UP capable ("yes" from the decision block 504), the flagging module of the presence application determines whether the user device is roaming, as indicated in decision block 506. If the user device is not UP capable ("no" from the decision block 504), the process returns to block 502.

The flagging module of the presence application may determine that the user device is roaming based on the PANI in the SIP request. If the user device is roaming ("yes" from the decision block 506), the flagging module indicates that the user device associated with the subscriber identifier is roaming, as indicated in block 514. At block 516, the configuration module of the presence application server removes the tuple associated with the presence information indicating UP capabilities. At block 518, the notification module of the presence application server transmits the SIP response to the user device.

If the flagging module determines that the user device is not roaming ("no" from the decision block 506), the flagging module determines whether the subscriber identifier associated with the subscriber of the user device is flagged in a centralized presence database. If the subscriber identifier associated with the subscriber of the user device is flagged ("yes" from the decision block 508), the flagging module removes the roaming flag associated with the subscriber identifier of the subscriber associated with the user device, as indicated in block 510. If the user device is not flagged ("no" from the decision block 508), the process returns to block 502. At block 512, the configuration module, in response to the flagging module removing the roaming flag, restores the tuple associated with the presence information of the user device in a SIP message to the user device.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    receiving a Session Initiation Protocol (SIP) request from a user device, the SIP request comprising presence information of the user device, P-Access-Network-Info (PANI), and a subscriber identifier of a subscriber associated with the user device;
    determining whether the user device comprises Universal Profile (UP) capabilities based at least on the presence information;
    in response to determining that the user device comprises UP capabilities, determining whether the user device is roaming based at least on the PANI;
    in response to determining that the user device is roaming, indicating that the user device associated with the subscriber identifier is roaming;
    in response to indicating that the user device is roaming, removing a tuple associated with the presence information indicating the UP capabilities of the user device in a SIP response to the user device; and
    transmitting the SIP response to the user device to suspend the UP capabilities for the user device.

2. The one or more non-transitory computer-readable media of claim 1, wherein the acts further comprise:
    receiving an additional SIP request from the user device, the SIP request comprising an updated PANI;
    determining whether the user device is roaming based at least on the updated PANI;
    in response to determining that the user device is not roaming, restoring the tuple associated with the presence information indicating the UP capabilities of the user device in an additional SIP response to the user device; and
    transmitting the additional SIP response to the user device to restore the UP capabilities for the user device.

3. The one or more non-transitory computer-readable media of claim 2, wherein the acts further comprise:
    indicating that the user device associated with the subscriber identifier is not roaming.

4. The one or more non-transitory computer-readable media of claim 1, wherein the indicating comprises setting a roaming flag for the subscriber identifier.

5. The one or more non-transitory computer-readable media of claim 1, wherein the subscriber identifier comprises a Mobile Station International Subscriber Directory Number (MSISDN).

6. The one or more non-transitory computer-readable media of claim 1, wherein the tuple comprises a file-transfer-HTTP (FTHTTP) tuple.

7. The one or more non-transitory computer-readable media of claim 1, the acts further comprising:
    storing the presence information of the user device in a centralized presence database.

8. The one or more non-transitory computer-readable media of claim 1, the acts further comprising:
    receiving an additional SIP request to subscribe to the presence information of the user device from an additional user device;
    retrieving the presence information of the user device from the centralized presence database; and
    transmitting an additional SIP response to the additional user device, the additional SIP response comprising the presence information of the user device indicating that the UP capabilities of the user device are suspended.

9. A computer-implemented method, comprising:
    receiving a Session Initiation Protocol (SIP) request from a user device, the SIP request comprising presence information of the user device, P-Access-Network-Info (PANI), and a subscriber identifier of a subscriber associated with the user device;
    determining whether the user device comprises Universal Profile (UP) capabilities based at least on the presence information;
    in response to determining that the user device comprises UP capabilities, determining whether the user device is roaming based at least on the PANI;
    in response to determining that the user device is roaming, indicating that the user device associated with the subscriber identifier is roaming;
    in response to indicating that the user device is roaming, removing a tuple associated with the presence information indicating the UP capabilities of the user device in a SIP response to the user device; and
    transmitting the SIP response to the user device to suspend the UP capabilities for the user device.

10. The computer-implemented method of claim 9, further comprising:
    receiving an additional SIP request from the user device, the SIP request comprising an updated PANI;
    determining whether the user device is roaming based at least on the updated PAM;
    in response to determining that the user device is not roaming, restoring the tuple associated with the presence information indicating the UP capabilities of the user device in an additional SIP response to the user device; and transmitting the additional SIP response to the user device to restore the UP capabilities for the user device.

11. The computer-implemented method of claim 10, further comprising:
indicating that the user device associated with the subscriber identifier is not roaming.

12. The computer-implemented method of claim 9, wherein the indicating comprises setting a roaming flag for the subscriber identifier.

13. The computer-implemented method of claim 9, wherein the subscriber identifier comprises a Mobile Station International Subscriber Directory Number (MSISDN).

14. The computer-implemented method of claim 9, wherein the tuple comprises a file-transfer-HTTP (FTHTTP) tuple.

15. The computer-implemented method of claim 9, further comprising:
storing the presence information of the user device in a centralized presence database.

16. The computer-implemented method of claim 9, further comprising:
receiving an additional SIP request to subscribe to the presence information of the user device from an additional user device;
retrieving the presence information of the user device from the centralized presence database; and
transmitting an additional SIP response to the additional user device, the additional SIP response comprising the presence information of the user device indicating that the UP capabilities of the user device are suspended.

17. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
receive a Session Initiation Protocol (SIP) request from a user device, the SIP request comprising presence information of the user device, P-Access-Network-Info (PANI), and a subscriber identifier of a subscriber associated with the user device;
determine whether the user device comprises Universal Profile (UP) capabilities based at least on the presence information, the presence information associated with a UP capability tuple indicating UP capabilities of the user device;
in response to determining that the user device comprises UP capabilities, determine whether the user device is roaming based at least on the PANI;
in response to determining that the user device is roaming; setting a roaming flag for the subscriber identifier to indicate that the user device is roaming;
in response to indicating that the user device is roaming, remove the UP capability tuple in a SIP response to the user device; and
transmit the SIP response to the user device to suspend the UP capabilities for the user device while the user device is roaming.

18. The system of claim 17, wherein the UP capability tuple comprises a file-transfer-HTTP (FTHTTP) tuple.

19. The system of claim 17, storing the roaming flag in a centralized presence database.

20. The system of claim 17, wherein the SIP request comprises a SIP PUBLISH message or a SIP SUBSCRIBE message.

* * * * *